UNITED STATES PATENT OFFICE.

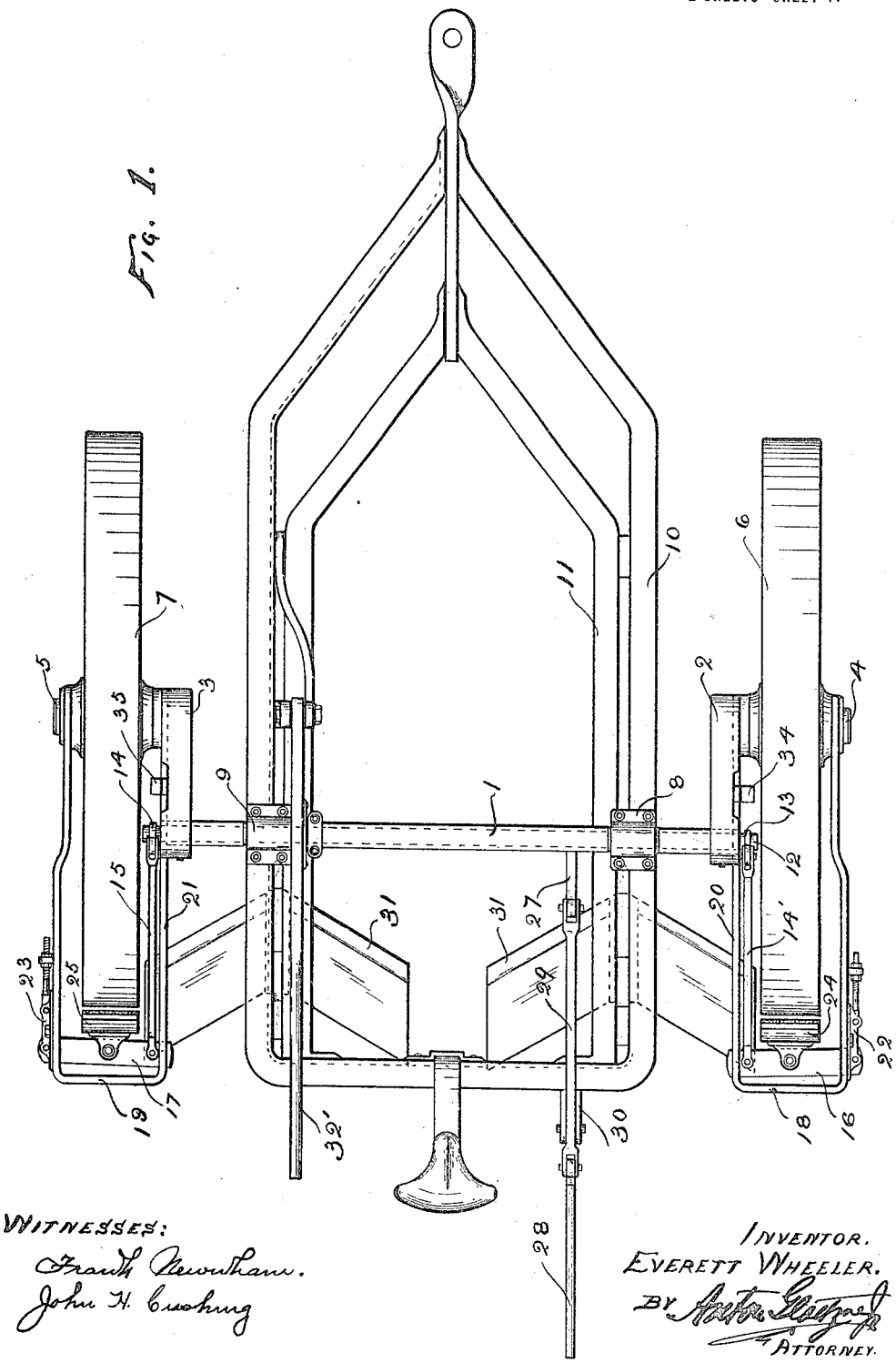

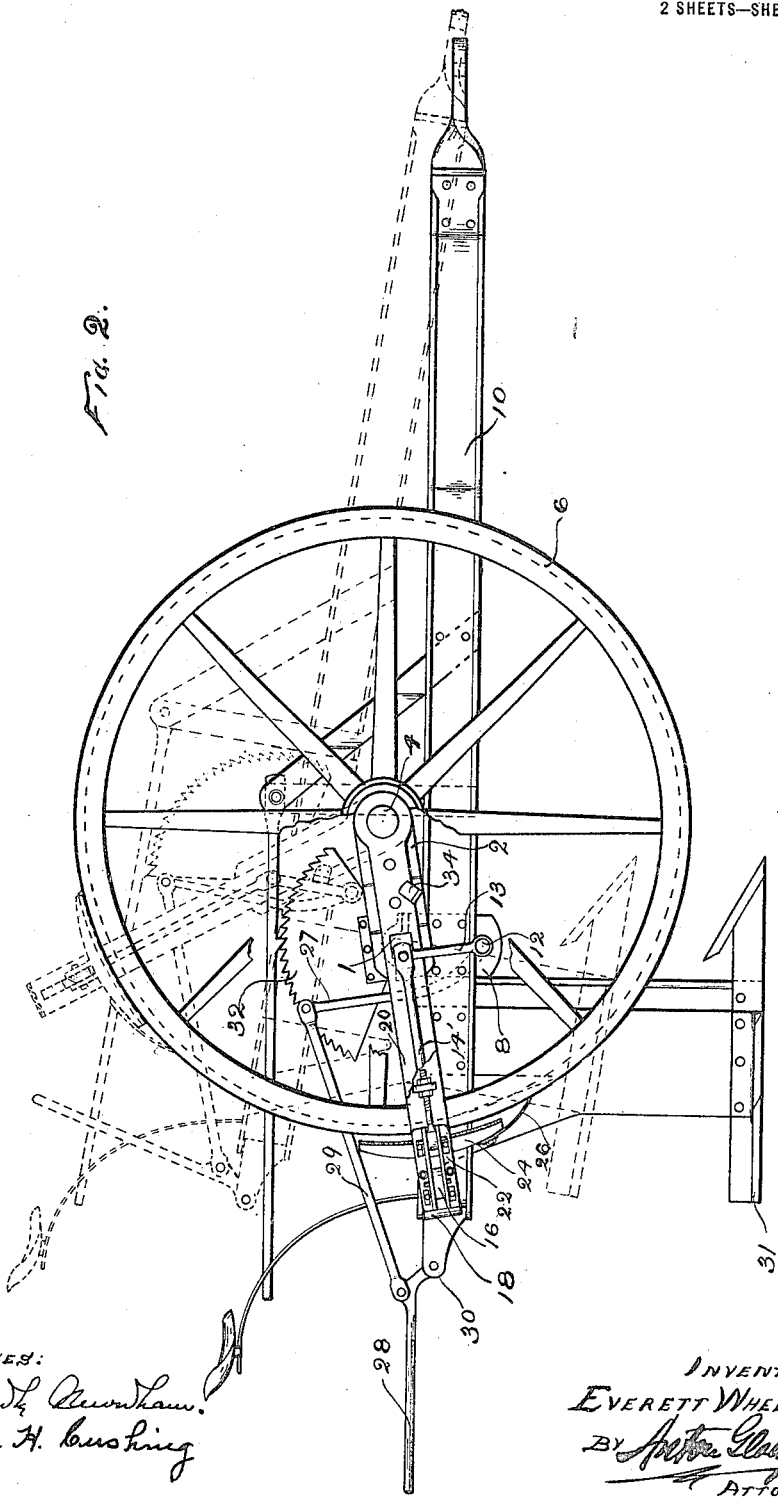

EVERETT WHEELER, OF VAN NUYS, CALIFORNIA.

PLOW.

1,231,225. Specification of Letters Patent. Patented June 26, 1917.

Application filed July 25, 1916. Serial No. 111,249.

*To all whom it may concern:*

Be it known that I, EVERETT WHEELER, a citizen of the United States, residing at Van Nuys, county of Los Angeles, and State of California, have invented a certain new and useful Improvement in Plows, of which the following is a specification.

My invention relates to improvements in agricultural implements, and has especial reference to sub-soil plows, an object of this invention being to provide a means for elevating and lowering the plow frame and its shares at will and to any desired height or depth within definite limits and while in operation, and to hold the frame and its shares in adjusted position.

In the accompanying drawings, I have illustrated a preferred embodiment of my invention, which, however, is susceptible of adaptation of a number of other agricultural and other implements, comprising in their assembly a frame to be lifted.

Figure 1 is a plan view of a plow showing my invention as applied, and

Fig. 2 is a side view, dotted lines illustrating elevated position of the frame.

Referring to the drawings, 1 designates a fulcrum journal, preferably square in cross-section, onto each end of which is secured a crank member 2 and 3 respectively. Said crank members 2 and 3 are provided with integral trunnions 4 and 5, respectively, for wheels 6 and 7. The fulcrum shaft 1 is supported by and journaled in bearings 8 and 9, which may be of a T-form, for purposes of the present description, and the vertical portions of which are extended between the main frame 10, and the reinforce 11 for the main frame. These vertical portions of the bearings 8 and 9, may also form supports for a journal 12, on which is secured arms 13 and 14, the ends of which are pivotally attached to brake rods 14' and 15, that are connected at one end to brake beams 16 and 17. These brake beams 16 and 17 are operatively mounted in slotted yokes 18 and 19, that straddle the wheels 6 and 7, and are rigidly mounted on the trunnions 4 and 5, of the crank members 2 and 3, respectively.

As seen, the inner arm 20 and 21, respectively, of each yoke 18 and 19, is secured to the respective crank members. The other end of said brake beams 16 and 17, is pivotally attached to plates 22 and 23, respectively, which are adjustably secured on said yokes 18 and 19, and through which the distance of the brake shoes 24 and 25, from the periphery of the wheels may be regulated. These brake shoes are pivotally mounted on said brake beams, as shown, and may be provided with scrapers 26, or other devices for removing objectionable accumulations.

The brake beams 16 and 17, are operated through the medium of the means described, by a lever 27, rigidly attached at one end to the said shaft 12, the other end being pivotally connected to an operating handle or lever 28, by means of a link 29. The handle or lever 28, is pivotally attached to a bracket 30, secured on the frame.

In construction, the pivotal centers of the links 13 and 14 and the brake rods 14' and 15 must register with the true axial center of the fulcrum journal 1, when the brake shoes 24 and 25 are applied, so that the arc described by those centers will be concentric with the trunnions, and the brake shoes will remain applied with equal force during the operative movement of the wheels, as hereinafter described.

The frame 10, with its plow shares 31, is provided with a toothed segment 32, which is secured in any strong manner to said fulcrum journal 1, and with which a toothed lever 32' coöperates to hold said frame in position relatively to the wheels.

Each crank member 2 and 3, respectively, is provided with a lug 34 and 35, for automatically disengaging the brake shoes when the frame has been elevated to its limit, as explained later.

Assuming the parts to be as shown in Fig. 2, and that the device is to be operated, the handle or lever 28, is raised to the position shown in dotted lines, whereby the brake shoes, through the medium of the transmitting links and levers are set against the periphery of the wheels. As the wheels revolve, the entire frame 10, and the plow shares thereon, together with the yokes, crank members and fulcrum journal, are lifted, the lifting continuing as long as the operator maintains the lever in operative position, until the lugs 34 and 35 strike against the links 13 and 14, and release the brake shoes automatically when the frame reaches its highest position.

In this manner the frame may be elevated either the full height or but for a small distance as desired by the operator, and held in such position.

Obviously, the frame once elevated, may be held in and released from such position by the toothed lever and segment, through which the frame may be allowed to drop a short distance or the entire distance of its movement, as desired.

What I claim, is:—

1. In a plow, a frame, a fulcrum journal thereon, cranks on said journal, having trunnions, wheels on said trunnions, yokes on said trunnions and rigidly connected with said cranks, brake shoes adjustably mounted in said yokes, means to operate said brake shoes to cause same to engage the wheels and lift the frame any desired height, and means automatically operable to hold said frame in lifted position when the brake shoes are removed, and manually operable to cause said frame to drop from lifted position.

2. In a plow, a frame, a fulcrum journal thereon having cranks, trunnions on said cranks, wheels on said trunnions, yokes straddling said wheels and mounted on said trunnions and rigidly connected with said cranks, brake beams carried by said yokes, brakes on said beams, a fulcrum shaft, means operable by the movement of said fulcrum shaft to operate said brake beams, means to operate said fulcrum shaft to cause said shoes to engage said wheels and lift said frame a desired height, and means to hold said frame in whatever position it has been lifted.

3. In a plow, a frame having a fulcrum journal thereon, cranks on said journal, trunnions on said cranks, wheels on said trunnions, yokes straddling said wheels and rigidly connected with said trunnions and cranks, beams operable in said yokes and adjustable means secured to said yokes and to said beams, operating means secured to said beams, brake shoes on said beams, a fulcrum shaft, means connecting the brake beam operating means with said fulcrum shaft, means to operate said fulcrum shaft to cause the brake shoes to be applied and lift the frame to any desired height, and means to lock the frame at any desired height.

4. In a plow, a fulcrum journal, a frame secured thereto, cranks on said journal having trunnions, wheels on said trunnions, yokes straddling said wheels and rigidly secured to said cranks and trunnions, beams adjustably mounted in said yokes, brakes on said beams, a fulcrum shaft, means connecting said brake beams and said fulcrum shaft, means to operate said fulcrum shaft to cause the application of said brakes to the wheels and the elevation of said frame to any desired height, a toothed segment on said fulcrum journal and a means coöperating with said toothed segment to lock said frame in any position.

In testimony whereof I have set my hand in the presence of two witnesses.

EVERETT WHEELER.

Witnesses:
HENRY E. STORRS,
ANTON GLOETZNER, Jr.

Copies of this patent may be obtained for five cents each, by addressing the "Commissioner of Patents, Washington, D. C."